United States Patent

Gay et al.

[11] Patent Number: 5,638,528
[45] Date of Patent: Jun. 10, 1997

[54] DATA PROCESSING SYSTEM AND A METHOD FOR CYCLING LONGWORD ADDRESSES DURING A BURST BUS CYCLE

[75] Inventors: James G. Gay, Pfugerville; Ronald W. Stence, Austin; Jefferson L. Gokingco, Austin; John P. Hansen, Austin, all of Tex.

[73] Assignee: Motorola, Inc., Schaumburg, Ill.

[21] Appl. No.: 143,731

[22] Filed: Nov. 1, 1993

[51] Int. Cl.$^6$ .................................................. G06F 12/02
[52] U.S. Cl. .............. 395/421.07; 395/496; 395/421.08; 395/421.09
[58] Field of Search ...................... 364/200 MS File, 364/900 MS File; 395/400, 425, 421.07, 421.08, 421.09, 303, 302, 306, 309

[56] References Cited

U.S. PATENT DOCUMENTS

| | | | |
|---|---|---|---|
| 3,639,909 | 2/1972 | Hauck et al. | 395/275 |
| 4,754,435 | 6/1988 | Takamatsu | 395/400 |
| 4,809,156 | 2/1989 | Taber | 395/421.07 |
| 4,912,630 | 3/1990 | Cochcroft, Jr. | 395/421.01 |
| 4,912,631 | 3/1990 | Hoyd | 395/445 |
| 5,029,124 | 7/1991 | Leahy et al. | 395/285 |
| 5,032,986 | 7/1991 | Pathak et al. | 395/421.07 |
| 5,237,567 | 8/1993 | Nay et al. | 370/85.1 |
| 5,255,378 | 10/1993 | Crawford et al. | 395/307 |
| 5,265,225 | 11/1993 | Young et al. | 395/421.07 |
| 5,269,012 | 12/1993 | Nakajima | 395/425 |
| 5,276,887 | 1/1994 | Haynie | 395/294 |
| 5,319,759 | 6/1994 | Chan | 395/421.07 |
| 5,345,573 | 9/1994 | Bowden, III et al. | 395/421.07 |
| 5,371,868 | 12/1994 | Koning et al. | 395/400 |

*Primary Examiner*—Eddie P. Chan
*Assistant Examiner*—Hiep T. Nguyen
*Attorney, Agent, or Firm*—Keith E. Witek

[57] ABSTRACT

A method and apparatus for controlling a bus within a data processing system has a first control bit (SAS*), and second control bit (CLA*), and at least one termination signal (TA*, TRA*, TEA*). The CLA* signal is an input to a primary master (10). The primary master (10) provides a base address external to the primary master (10) so that a slave device can access the base address. The CLA* signal is asserted by the slave device to signal that the base address is to be cycled in a bit-wise circular fashion to provide a plurality of addresses out from the primary master (10) wherein each address in the plurality is derived from the base address internal to the primary master (10). Typically four addresses are provided per base address via the internal control of the primary master (10) in response to three sequential assertions of the CLA* signal.

31 Claims, 10 Drawing Sheets

FIG. 7 -PRIOR ART-

DATA PROCESSING SYSTEM AND A METHOD FOR CYCLING LONGWORD ADDRESSES DURING A BURST BUS CYCLE

FIELD OF THE INVENTION

The present invention relates generally to data processing systems, and more particularly, to bus protocols.

BACKGROUND OF THE INVENTION

In the integrated circuit and system design industry, a bus protocol is used to control the operation of a bus or a plurality of interconnections between devices and/or integrated circuits. The bus protocol usually directly impacts the systems performance. For example, bus protocols have been designed to perform burst bus cycles. In a burst bus cycle, a base address is provided external to a data processor. In an memory device or latch, which is external to the data processor, a group of bits of the address are latched or stored. Logic or a state machine external to the data processor is used to cycle the latches or memory devices in a manner which manipulates the base address in a sequential fashion to form two or more unique addresses from the single base address. Data corresponding to each of these unique addresses is read from a memory external to the data processor in a manner which is faster than providing the unique addresses individually from the processor.

Unfortunately external counters and glue logic/state machines are difficult to design and difficult to operate with fast-operating microprocessor systems. At very high frequencies, due to the on-to-off chip delays, the formation of external logic signals which control the external counters and glue logic/state machines are slow and address cycling may be impossible to accomplish.

Furthermore, two devices in a system will usually communicate with one another. Therefore, bus protocols usually require some mechanism to acknowledge or terminate a bus transfer initiated by one device to transmit data to a second device. In prior bus protocols, acknowledge signal(s) were required to be valid (i.e. a valid logic one or a valid logic zero) about all clock edges of the system clock. This is cumbersome because at high frequencies, a slave device may not be able to actively assert or deassert an acknowledge signal coupled to a master device before the master device experiences a clock edge. Buses with transmission line effects further enhance this problem.

Therefore, a new bus protocol is required in order to improve upon the disadvantages listed above.

SUMMARY OF THE INVENTION

The previously mentioned disadvantages are overcome and other advantages achieved with the present invention. In one form, the present invention comprises a method for controlling an external address of a data processor during a burst bus cycle. The burst bus cycle being a bus cycle wherein a plurality of data values are sequentially transferred to the data processor from circuitry external to the data processor. The data processor has an external input for receiving a control signal generated by the circuitry external to the data processor. The method begins by performing a step (a) wherein a base address external is provided by the data processor via an external bus coupled to the data processor. A step (b) is performed wherein a first control signal is asserted via the circuitry external to the data processor and input to the external input. A step (c) is performed wherein the base address is altered to another address which is different from the base address via circuitry internal to the data processor in response to the assertion of the first control signal. Steps (b) and (c) are repeated a predetermined number of times.

In another form the invention comprises a data processing system. The data processing system has a bus protocol for controlling a bus within the data processing system, the data processing system has a primary master. The primary master has an input for receiving a control signal. The primary master circularly increments a first address provided on the bus to a second address in response to the assertion of the control signal. The data processing system has a slave device coupled to the primary master via the bus. The slave device has an output for providing the control signal to the primary master. The control signal being asserted by the slave device in response to receiving a first address. A bus arbiter is coupled to the primary master for determining ownership of the bus within the data processing system.

The present invention will be more clearly understood from the detailed description below in conjunction with the accompanying drawings.

Figure 1:
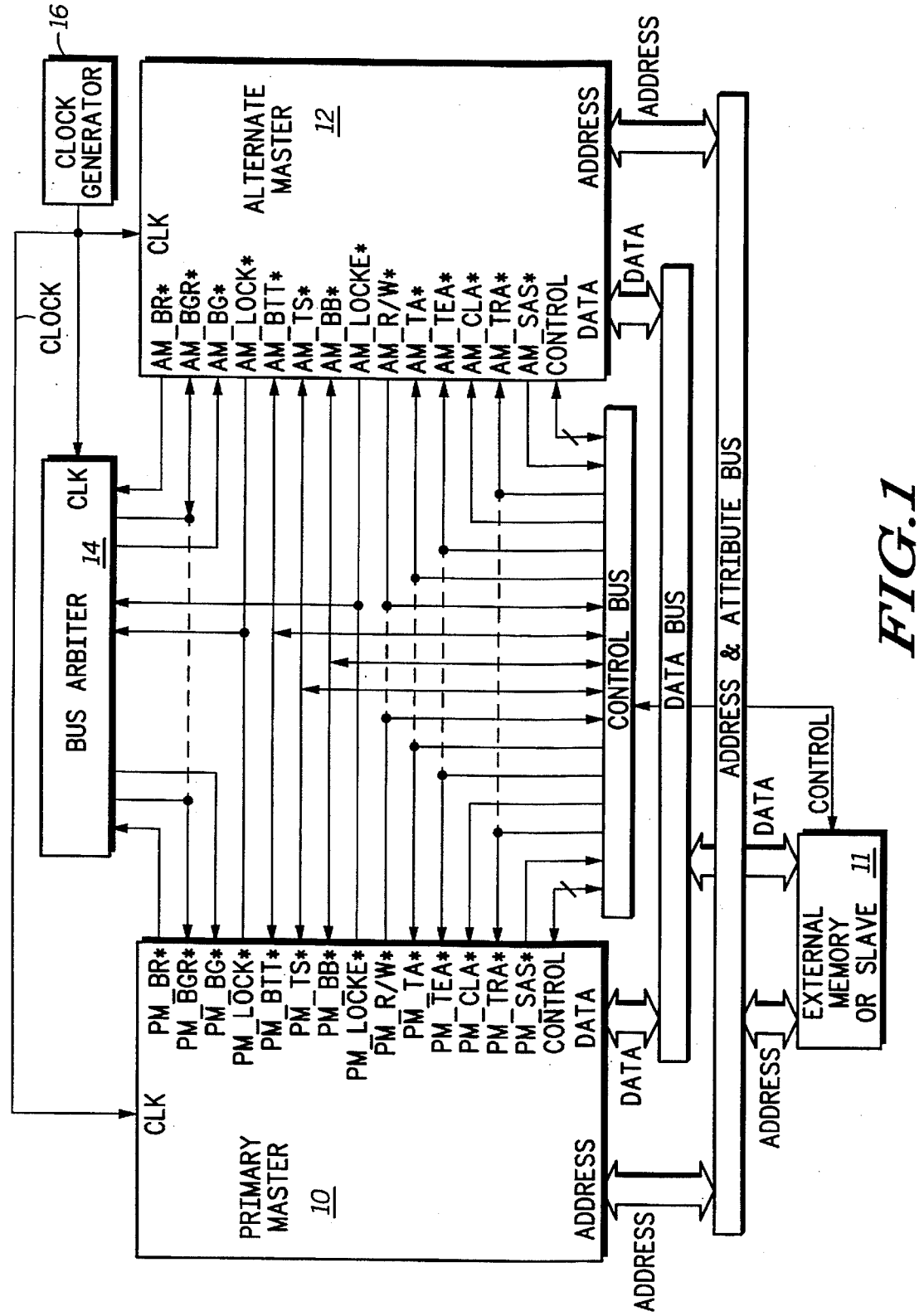
FIG. 1 illustrates, in a block diagram, a system used to implement a bus protocol in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Illustrated in FIG. 1 is a data processing system. The data processing system has a primary master 10, a bus controller/arbiter 14, an alternate master 12, and a clock generator 16. Several control signals interconnect the elements of FIG. 1. These control signals are discussed later in this description. A control bus is used in FIG. 1 to route the control signals. Solid lines in FIG. 1 illustrate preferred connections within the data processing system. Dashed lines in FIG. 1 illustrate alternative or additional connections which may be made between control signals. Other signals may be interconnected within the control bus. FIG. 1 illustrates both an address bus and a data bus.

It should be noted that the '*' symbol in signal names within FIG. 1 indicates that the signal is an active low signal. Primary master 10 may be a microprocessor, a pipelined execution device, an application specific integrated circuit (ASIC) device, a programmable logic array (PLA), hard-wired logic, an execution unit at least partially software driven by microcode and/or nanocode, a plurality of execution devices, a digital signal processor (DSP), a computer, a data processor, a central processing unit (CPU), and/or the like. Also, the signals in FIG. 1 carry a prefix which is either "PM" or "AM". The prefix "PM" means that particular signal is generated or received by the primary master 10 whereas "AM" means that particular signal is generated or received by the alternate master 12. The control signals illustrated in FIG. 1 are discussed below in detail.

In FIG. 1, the Transfer Start (TS*) signal is asserted by the primary master 10 during the clock cycle in which the address lines become stable in a bus cycle, and is negated the very next (i.e., following) clock cycle. The TS* signal is examined when a system master is not the bus master (i.e., does not have ownership of the bus) to determine the start of any snoop access requests. It is also examined when the primary master 10 is not the bus master to maintain internal state about bus ownership rights. All masters which can perform bus cycles on the bus will have their TS* signals bused together. When the primary master 10 is not the bus master, the TS* signal out of the primary master 10 is tristated.

FIG. 1 illustrates a Transmission Acknowledge (TA*) signal wherein, as indicated above, the '*' character signifies that the control signal is an active low control signal. When the primary master 10 has ownership of the bus (i.e., the primary master has received an asserted Bus Grant (BG*) signal and is initiating a bus transfer via a Transfer Start (TS*) signal), the TA* signal is asserted by a current slave device (e.g. a memory device or location) with which the primary master 10 is communicating with via one or more buses. The TA* signal is asserted at the clock where new data is valid and ready to be sampled during a bus read operation, or at the clock where data is accepted by the slave during a bus write operation. For the primary master 10 to accept the transfer as successful with a transfer acknowledge, the Transfer Retry Acknowledge (TRA*) signal and the Transfer Error Acknowledge (TEA*) signal of FIG. 1 must both be negated when TA* is asserted. In other words, the TA* signal is of a lower priority than the TEA* signals or the TRA* signal.

The Transfer Error Acknowledge (TEA*) signal, illustrated in FIG. 1, is asserted by the current slave to indicate that a bus error condition occurred for the current transfer. The TEA* signal indicates that the bus cycle, due to the error condition, should be immediately terminated. The assertion of TEA* has precedence over the TRA* signal and the TA* signal in a preferred mode of operation.

In a preferred mode of operation, the Transfer Retry Acknowledge (TRA*) signal is asserted by the current slave device on the first transfer of a bus cycle to indicate the need to rerun the current bus cycle. However, assertion of TRA* on any other transfer but the first transfer will be ignored. The assertion of TRA* has precedence over TA* on the first transfer of a bus cycle, but TRA* does not have precedence over TEA*.

FIG. 1 illustrates a Bus Request (BR*) signal. The BR* signal is sent by the primary master 10 to the external bus arbiter 14 and can be asserted or negated at any time. The BR* signal is asserted by the primary master 10 to indicate a need to use a bus within the system 10. The BR* signal is held asserted until the master no longer needs the bus. This asserted time period includes time when the primary master 10 has ownership of the bus as well as when the primary master 10 does not have ownership of the bus.

Note that the need by the primary master 10 to use the bus may evaporate due to changes in an internal state of the primary master 10 before the bus arbiter 14 can grant the bus to the primary master 10. This would be the case if BR* was ever asserted for some period of time and then negated before the Bus Grant (BG*) could be asserted by the external bus arbiter 14. Thus, the external bus arbiter 14 must handle the case where the primary master 10 requests usage of the bus but never actually takes over bus mastership when the bus arbiter asserts BG* to the processor. This case can be detected by noting that the primary master 10 has negated BR* and does not assert Transfer Start (TS*) on the next clock edge after BG* has been asserted by the external bus arbiter 14. It should be noted that this is not the case if BG* has been asserted to the primary master 10 processor and the processor still has BR* asserted but has not yet asserted TS*. A delay in the assertion of TS*, with BR* remaining asserted, by the primary master 10 after it has received BG* is due to a special internal condition caused by an operand bus operation which preempts an instruction bus request operation. In this case, the primary master 10 still intends to use the bus as long as BR* remains asserted.

In FIG. 1, a Bus Grant (BG*) signal is illustrated. The Bus Grant (BG*) signal provided by the external arbiter 14 to the primary master 10 indicating that the primary master 10 can control the bus as soon as the current master finishes the current bus cycle and relinquishes the bus via a Bus Tenure Termination (BTT*) signal or the negation of the Bus Busy (BB*) signal. When BG* is negated by the arbiter 14, the primary master 10 relinquishes the bus as soon as the current bus cycle is complete unless an unseparable locked sequence of bus cycles is in progress, in which case the primary master 10 will complete the sequence of atomic/unseparable locked bus cycles, and then give indication it has relinquished the bus by asserting BTT* and negating BB*. Locked bus cycles are indicated via a LOCK* signal in FIG. 1.

BTT* is asserted for one clock period to indicate to other masters (i.e., alternate master 12) in the system that the primary master 10 has relinquished its bus tenure after the external arbiter 14 has negated BG* to the master 10. BTT* is driven negated for one clock period immediately after its assertion. At all other times BTT* is tristated by the primary master 10. The primary master 10 only samples BTT* as an input when it is not the bus master to maintain internal state and keep track of when it may take over bus mastership/ownership. To properly maintain this internal state information, all masters on the bus will have their TS* signals bused together so the primary master 10 can keep track of coupled TS*-BTT* pairs. A TS* signal with no terminating BTT* signal means that the bus is currently in use. A TS* signal followed by a BTT* signal means that the bus is no longer in the middle of a bus cycle.

Unlike BTT*, which signals the end of bus tenure by the primary master 10 processor, BB* provides a continuous indication of a master's bus tenure. BB* may be used to the exclusion of BTT*, and vice versa, although the BTT* signal is preferred due to the fact that the BTT* signal has no chance of producing a bus contention problem as does the BB* signal. BB* is monitored as a processor input to determine when a prior bus master has released control of the bus. The primary master 10 determines bus availability on a clock edge-by-clock edge basis and the bus is considered available for use if BG* is asserted and both TS* and BB* are negated to the processor. If these conditions are met and the primary master 10 has a current need to use the bus, BB* is asserted with the first assertion of TS*. BB* remains asserted until the primary master 10 has relinquished bus ownership after the negation of Bus Grant (BG*) from the arbiter 14. When the primary master 10 receives a deasserted Bus Grant (BG*) signal and has finished the last transfer of the final bus cycle of its tenure, the primary master 10 will negate BB* for one clock period and then tristate BB* and continue to sample it as an input. Note that the one clock period when BB* is driven negated is one primary master clock period, not a full clock period. This implies that use of bused BB* signals and protocol limits how fast an external bus arbiter can allow bus mastership change-overs in a full bus speed system.

Since BB* will be driven negated for one full clock period a bus fight could occur with respect to the BB* signal on bus mastership change-overs when the primary master 10 is in the process of changing from driving BB* negated to tristating BB* at the same time when a new bus master starts to assert its BB* signal. Prior processors did not have this potential fight condition because it only drove BB* negated for a fraction of a clock period, however, the primary master 10 samples and controls all its signals with respect to rising clock edges. To provide for the greatest performance at high frequencies and full bus speed, the BTT* signal and protocol are provided and recommended as indicated above. The assertion, negation and tristating of BTT* always, and only, occurs on a rising clock edge basis in a preferred form.

If the BB* signal and protocol are used in place of BTT*, the BTT* signal should be continuously pulled-up through a resistor to a negated state.

A LOCK* signal is asserted in FIG. 1 by the primary master 10 to indicate the current bus cycle and all subsequent bus cycles are intended to be atomic (i.e., unseparable) until LOCK* is negated. LOCK* is asserted with TS* and is negated with the termination of the last transfer in a locked sequence of bus cycles. Note that the last bus cycle of the locked sequence can be retried but still guarantee the lock atomicity provided BG* is not negated with BGR* asserted. LOCK* is also asserted with TS* when a LOCK bit in the Bus Control Register (BCR) of the primary master 10 is set, and negated when the BCR LOCK bit is reset via a MOVEC (move control) primary master computer instruction. Additionally, LOCK* will be asserted by the primary master 10 during updates of history information in memory management unit (MMU) tablewalks.

The LOCK* bus signal indicates the primary master 10 intends a set of bus cycles to be atomically locked together or uninterrupted. However, the primary master 10 can be forced to relinquish the bus in the middle of a locked sequence, at the end of the current bus cycle, if the BG* signal is negated and BGR* is asserted.

When the primary master 10 loses bus mastership/ownership, LOCK* is driven negated for one full clock period, if it was previously asserted, and then tristated one clock cycle after the address bus is idled. If LOCK* was already being driven negated in the bus cycle in which the primary master 10 loses bus mastership it will be tristated in the same clock period the address bus is idled.

The Bus Lock End (LOCKE*) signal is asserted with TS* to indicate the current bus cycle is the last bus cycle in the locked sequence of bus cycles. The external arbiter 14 can use LOCKE* to allow arbitration between unrelated back-to-back locked transfer sequences while still maintaining the indivisible nature of each locked operation. Note that LOCKE* is provided to help make the primary master 10 bus compatible with previous bus protocols (i.e., family compatibility), however, for new designs, external bus arbitration logic can be simplified with the use of BGR* instead of LOCKE*. The timing and action of LOCKE* is the same as LOCK* when the primary master 10 loses bus mastership/ownership.

FIG. 1 illustrates a Bus Grant Relinquish (BGR*) signal. BGR* is a qualifier for BG* which indicates to the primary master 10 the degree of necessity for relinquishing bus ownership when BG* is negated. BGR* affects how the primary master 10 will behave during atomic locked sequences when BG* is negated. The assertion of BGR* indicates to the primary master 10 that bus ownership should be relinquished on the last transfer of the current bus cycle when BG* is negated even if the primary master 10 had intended a series of bus cycles be locked together. BGR* negated when BG* is negated indicates to the primary master 10 bus ownership should be relinquished under locked bus conditions (LOCK* asserted) only after the entire series of locked bus cycles has finished to guarantee no disruption of the atomic sequence occurs.

FIG. 1 uses a Transfer Cache Inhibit In (TCI*) signal although TCI* is not illustrated in FIG. 1 to preserve the clarity of FIG. 1. Any not illustrated signals may be considered to be a part of CONTROL in FIG. 1. The TCI* signal is a bus cycle transfer qualifier and may be asserted by the current slave to indicate the current data transfer information should not be cached in the internal caches by the primary master 10. The TCI* input must be valid on the first assertion of TA* when the primary master 10 is sampling the termination acknowledge signals. TCI* is ignored by the primary master 10 after the first assertion of TA* of a burst bus cycle and is completely ignored in non-burst read bus cycles and all types of write bus cycles.

FIG. 1 uses a Transfer In Progress (TIP*) signal (not specifically illustrated in FIG. 1). The TIP* signal is asserted with TS* to indicate a bus cycle is currently in progress. TIP* is negated after the final termination acknowledgment (i.e. the assertion of one or more of TA*, TEA*, or TRA*) of the bus cycle if another bus cycle does not immediately start. Bus cycles which end and begin in back-to-back fashion will cause TIP* to be continuously asserted.

When the primary master 10 loses bus mastership and has finished the last transfer of the final bus cycle of its tenure, the primary master 10 will negate TIP* for one clock period if it was previously asserted, and then tristate TIP*. If TIP* was already being driven negated in the bus cycle in which the primary master 10 loses bus mastership it will be tristated in the same clock period the address bus is idled. Note that the one clock period when TIP* is driven negated is one primary master 10 processor clock period, not a full clock period. This implies that use of bused TIP* signals and protocol limits how fast an external bus arbiter can allow bus mastership change-overs in a full bus speed system (this is not a concern for a ½ or ¼ speed bus since there will be from two to four primary master 10 processor clock periods, respectively, between the fastest bus mastership change-overs). Since TIP* will be driven negated for one full clock period, a bus fight (i.e., bus contention) could occur with respect to the TIP* signal on bus mastership change-overs when the primary master 10 is in the process of changing from driving TIP* negated to tristating TIP* at the same time when a new bus master starts to assert its TIP* signal. Previous processors do not have this potential fight condition because it only drives TIP* negated for a fraction of a clock period. However, the primary master 10 samples and controls all its signals with respect to rising clock edges. To provide for the greatest performance at high frequencies and full bus speed, the TIP* signal and protocol should not be used or at least the TIP* signal should not be bused with other bus masters using TIP*.

FIG. 1 illustrates a read/write (R/W*) signal. R/W* is driven by the primary master 10 when the primary master 10 is the bus master. The R/W* signal indicates the direction (i.e., data going into the primary master 10 [a read] or data going out of the primary master 10 [a write]) of subsequent data transfer(s). It is asserted high during read bus cycles and asserted low during write bus cycles. Timing of the R/W* signal is the same as the address lines. When the primary master 10 is not the bus master, the R/W* signal is tristated.

Address signals are primarily output by the primary master 10 when it is the bus master (i.e., has ownership of the bus) to indicate the address of the first item of a bus transfer. Address signals are preferably represented in FIG. 1 via a 32-bit bus although other sized address buses may be used in FIG. 1. If the processor is not the bus master but is allowed to snoop the access when an alternate master has ownership of the bus, the address signals are examined to check for, and invalidate, matching entries in the primary master's internal cache(s).

FIG. 1 uses an Reset In (RSTI*) signal (although RSTI* is not specifically illustrated in FIG. 1). The assertion of RSTI* will cause the primary master 10 to enter reset exception processing. RSTI* is an asynchronous input which is synchronized to clock enabled-rising clock (CLK) edges. All tristateable pins will be tristated when RSTI* is recognized.

FIG. 1 illustrates a Clock (CLK) signal. The clock signal (CLK) is generated by a clock generation circuit 16 and may be one or more clocks.

The data lines, in FIG. 1, are bi-directional bus signals that carry the data for the current transaction. Data carried may be due to either a read or a write operation as indicated by the R/W* signal. During a burst bus cycle, the data lines are time-multiplexed to carry all parts of the overall burst request.

The Cycle Longword Address (CLA*) signal controls the operation of A[3:2] (i.e., the third and fourth least significant address bits) during bus cycles. After each clock edge when CLA* is asserted, the longword address for each of the four transfers (A[3:2]) will increment in circular wrap-around fashion. If CLA* is negated A[3:2] will not change, remaining fixed, as in prior bus masters that are in the processor family which includes the primary master 10. The CLA* signal is further discussed below.

FIG. 1 illustrates a Start Acknowledge Termination Sampling (SAS*) signal. SAS* is a status signal which indicates that the primary master 10 will begin sampling the termination acknowledge signals (TA*, TEA*, TRA*) starting with the next rising edge of the clock enabled-clock. SAS* is used to create a dead-time wherein the TA*, TRA*, and TEA* signals are not sampled so that the TA*, TRA*, and TEA* termination signals do not always have to be valid. The use of a dead-time via the SAS* signal allows a faster bus speed to be utilized. The SAS* signal is further discussed below.

FIG. 1 uses some reset configuration signals labeled IPL*[2:0] which are not specifically illustrated in FIG. I for simplicity of illustration. These signals of the primary master 10 have special functionality at reset time which is disjoint from their normal use. The IPL*[2:0] lines are used during reset time to program different modes of bus operation for the primary master 10. During reset, the logic levels on the IPL*[2:0] lines are registered and determine if a termination acknowledge ignore state feature is enabled/disabled. The IPL*[2:0] bits also determine whether the part uses an encoded family-compatible TA* and TEA* protocol or an unencoded TA*, TRA*, TEA* termination acknowledgment protocol. The IPL*[2:0] also determines if Extra Data Write Hold Mode is enabled/disabled. The Extra Data Write Hold Mode allows the bits on the Data Lines/Data Bus to be held valid longer than usual to improve processor performance. If the termination acknowledge ignore state feature is enabled the lower data bus (D[15:0]) is also registered during reset time to set appropriate internal ignore state counters within the primary master 10.

A table illustrated below details the reset configuration abilities provided by the IPL*[2:0] signals:

| Bit | Bit's State | Action |
| --- | --- | --- |
| IPL*[2] | Asserted | Extra Data Write Hold Mode enabled |
| IPL*[2] | Negated | Extra Data Write Hold Mode disabled |
| IPL*[1] | Asserted | Unencoded TA*, TRA*, TEA* used |
| IPL*[1] | Negated | Family-compatible encoded TA*/ TEA* used |
| IPL*[0] | Asserted | Termination acknowledge ignore state enabled |
| IPL*[0] | Negated | Termination acknowledge ignore state disabled |

The primary master 10 provides termination acknowledge ignore state capability to make high frequency system design easier. If IPL*[0] is asserted during the immediately preceding rising clock edge when Reset In (RSTI*) changes from being asserted to being negated, the values on D[15:0] at this clock edge time will be registered into ignore state counter registers within the primary master 10. Ignore state counters are used during bus cycles to determine at which rising edges of the clock, transfer termination acknowledge signals (TA*, TRA*, and TEA*) should be ignored or sampled. It is important to note that other transfer termination bits may be used in the system 10. Four, unique, 4-bit counters are used to provide independent ignore state times for primary and secondary, read and write transfers. With respect to this discussion "primary" refers to the first, and only, transfer of a bus cycle which may be of byte, word, or longword size in a non-burst bus cycle or the first longword transfer of a burst cycle. "Secondary" refers to subsequent transfers after the first transfer in a burst bus cycle. See the remarks made below for the details of ignore state counter operation.

If IPL*[0] is not asserted during the immediately proceeding rising clock edge when RSTI* changes from being asserted to being negated, the values on D[15:0] are ignored and the ignore state count registers are initialized to zero such that there are no times at which the termination acknowledge signals will be ignored. This can be thought of as a degenerate case that behaves exactly like previous family-compatible buses which required valid levels on the termination acknowledge signals at every rising edge of the clock. The following table illustrates how the data lines D[15:0] are parsed into four nibbles in order to load the various ignore state registers within the primary master 10.

| Data Nibble | Ignore State Counter |
|---|---|
| D[15:12] | Primary Ignore State Counter for Read Cycles |
| D[11:8] | Secondary Ignore State Counter for Read Cycles |
| D[7:4] | Primary Ignore State Counter for Write Cycles |
| D[3:0] | Secondary Ignore State Counter for Write Cycles |

The use of ignore states when sampling for a termination signal (i.e., TA*, TEA*, or TRA*) and the various ways a bus transfer can be terminated as discussed below.

The primary master 10 provides termination ignore state capability to make high frequency system design easier. If IPL*[0] is asserted during the immediately preceding rising clock edge when Reset In (RSTI*) changes from being asserted to being negated, the values on D[15:0] at this clock edge time will be registered into the ignore state counter registers as indicated above. Ignore state counters are used during bus cycles to determine at which rising edges of the clock, transfer termination acknowledge signals (TA*, TRA*, TEA* and AVEC*) should be ignored or sampled. The AVEC* signal is an Autovector signal that is asserted concurrently with TA* during an interrupt acknowledge bus cycle to indicate a request for internal generation of interrupt vector numbers. Four unique, 4-bit counters are used to provide independent ignore state times for primary and secondary, read and write transfers. With respect to this discussion, "primary" refers to the first, and only, transfer of a bus cycle which may be of byte, word, or longword size in a non-burst bus cycle or the first longword transfer of a burst bus cycle. "Secondary" refers to subsequent transfers after the first transfer in a burst bus cycle. At the start of each bus cycle, the primary and, if the cycle is a burst cycle, the secondary ignore state counters will be initialized with the appropriate values for either a read or a write cycle. The initial count values are those which were registered in the ignore state counter registers from D[15:0] at reset time (see previous text table). At the beginning of the bus cycle, the primary counter will be decremented on each rising clock edge (CLK) until the counter has reached zero. During the time before the counter reaches zero, the termination acknowledge signals are ignored (i.e., not sampled). When the respective counter reaches zero, the termination acknowledge signals are sampled every clock edge (CLK edge) until a termination (one or more of TA*, TEA*, or TRA*) is detected.

If a valid termination has occurred for the first transfer of a burst bus cycle, the secondary counter will then be used for determining periods of time to ignore and sample the termination acknowledge signals on all subsequent transfers of the bus cycle. This ignore state feature provides a manner by which the termination acknowledge signals can be ignored even if asserted or if not yet settled at a valid logic level. However, once the ignore period has elapsed (i.e., the 4-bit counter has reached zero) and the primary master 10 begins sampling, slave devices are still free to not respond with a termination acknowledgment by keeping the proper termination acknowledge signals negated. The total of the ignore state periods plus the termination acknowledge delay periods after the primary master 10 starts sampling is equal to the number of "wait states" the primary master 10 incurs, waiting for the slave response.

With this feature, external logic has time to derive and present valid levels (either asserted or negated) on the termination acknowledge signals (TA*, TRA*, and/or TEA*) at clock edges without having to have valid levels at every rising edge of the clock. Therefore, the ignore state feature makes high frequency system design easier because it prevents external logic propagation variations and transmission line reflection ringing from becoming a problem since the termination acknowledge signals can be ignored during times when they are settling.

The ignore state feature of the primary master 10 determines specific times at which the termination acknowledge signals are sampled. Assuming the ignore state time, if any, has elapsed and primary master 10 is sampling the termination acknowledge signals (TA*, TRA*, TEA* and AVEC*), the termination acknowledge signals along with the TCI* qualifier (TCI* is a bit which determines whether or not bus transferred data should be cached), determine the type of transfer acknowledgment. A table illustrated below indicates the various types of transfer termination acknowledgments which may be given by slave devices when the part is operating in a preferred Acknowledge Termination Mode ('x'=don't care condition):

| TA* | TRA* | TEA* | TCI* | Action |
|---|---|---|---|---|
| x | x | 0 | x | Bus cycle termination with bus error trap |
| x | 0 | 1 | x | Bus cycle termination with retry[1] |
| 0 | 1 | 1 | 1 | Normal transfer acknowledge termination |
| 0 | 1 | 1 | 0 | Trans. ack. termination with cache inhibit[2] |
| 1 | 1 | 1 | x | Insert wait states in current bus transfer |

[1] A retry acknowledge termination is only possible on the first transfer of a bus cycle; if TRA* is asserted on any transfer except the first transfer of the burst cycle, it will be ignored.
[2] A transfer acknowledge with cache inhibit is only possible on the first transfer of a burst cycle; if TCI* is asserted on any transfer except the first transfer of the burst cycle, it will be ignored.

Another table, illustrated below, indicates the meaning of various termination acknowledgments when the primary master 10 is configured to operate in family-compatible Acknowledge Termination Mode.

| TA* | TRA*[1] | TEA* | TCI* | Action |
|---|---|---|---|---|
| 1 | 1 | 0 | x | Bus cycle termination with bus error trap |
| 0 | 1 | 0 | x | Bus cycle termination with retry[2] |
| 0 | 1 | 1 | 1 | Normal transfer acknowledge termination |
| 0 | 1 | 1 | 0 | Trans. ack. termination with cache inhibit[3] |

-continued

| TA* | TRA*[1] | TEA* | TCI* | Action |
|---|---|---|---|---|
| 1 | 1 | 1 | x | Insert wait states in current bus transfer |

[1] In a family-compatible Acknowledge Termination Mode, TRA* must be continuously negated during a bus cycle.
[2] A retry acknowledge termination is only possible on the first transfer of a bus cycle; if TA* or TEA* are both asserted on any transfer except the first transfer of the burst cycle, the bus cycle will be immediately terminated as if an error acknowledge was returned.
[3] A transfer acknowledge with cache inhibit is only possible on the first transfer of a burst cycle; if TCI* is asserted on any transfer except the first transfer of the burst cycle, it will be ignored.

For a byte, word, or longword bus operation, the bus cycle is terminated on the first and only assertion of TA*, TRA* or TEA*. For burst bus cycle transfers, the bus cycle is terminated on the last (fourth) assertion of TA* for a normal acknowledge, or on the assertion of retry (TRA* is available in the preferred bus protocol mode but not available in the family-compatible Acknowledge Termination Mode; to perform a TRA* in the family-compatible mode, or TA* in negated and TEA* is asserted) during the first transfer of a bus cycle, or on the assertion of a transfer error acknowledge (TEA* is asserted on any transfer in the preferred Acknowledge Termination Mode; TA* and TEA* is asserted during any transfer but the first transfer in the family-compatible Acknowledge Termination Mode) for an abnormal acknowledge. Wait states are incurred in a bus transfer until a termination acknowledgment of either TA*, TRA*, or TEA* is recognized by the primary master 10.

The TCI* input is a qualifier which denotes the cachability of a line read bus cycle transfer and must be valid on the first assertion of TA* when the primary master 10 is sampling the termination acknowledge signals. TCI* is ignored by the primary master 10 after the first assertion of TA* of a burst bus cycle and is completely ignored in non-burst read bus cycles and all write bus cycles. TCI* in no way affects the length of a burst bus cycle transfer; four longwords are always transferred if no abnormal transfer acknowledgment is returned.

Assuming a primary ignore state setting of zero, TA*, TRA* and TEA* are ignored by the processor until the clock edge after TS* is asserted at the beginning of a bus cycle. After a bus cycle has finished, TA*, TRA* and TEA* are also ignored.

SAS* is a status signal provided as an aid for system debug, but can also be used to provide a capability for easy generation of termination acknowledgment signals beyond the settings of the ignore state counters. For systems in which a slave device may simply assert certain termination acknowledgment signals for the entire bus cycle, SAS* can be used to determine the clock edges when the primary master 10 starts sampling the termination acknowledgment signals and data.

SAS* can also be used to actually generate termination acknowledgment signals in systems where it is preferred to not assert a termination acknowledgment for the entire bus cycle. Since the times at which SAS* is asserted are determined by the ignore state counter settings, SAS* can be routed either directly back to the appropriate primary master 10 termination acknowledgment signal (e.g., TA*) or through an n-length shift register and back to the primary master 10 as the TA* signal with the depth of the shift register determining the number of wait states incurred. This provides an easy mechanism for generation of the appropriate termination acknowledgment signals beyond the limits of the ignore state count, and can provide from zero to an unlimited number of additional wait states beyond the ignore state count limits.

SAS* can even be fed back directly into the CLA* input to automatically cycle the longword offset (A[3:2]). For higher performance DRAM designs, the ignore state settings can be adjusted to cause SAS* to assert one clock edge before the actual TA* will be asserted to automatically cycle the longword offset.

For transfers which terminate normally, TA* is asserted by the responding slave while TEA*, TRA* and TCI* remain negated. For transfers which must be terminated with an error indication, TEA* is asserted by the responding slave and TRA*, TA*, and TCI* are ignored by the primary master 10 processor, if the primary master 10 is in a preferred Acknowledge Termination Mode. If the primary master 10 is in a family-compatible Acknowledge Termination Mode, TEA* asserted and TA* negated on any transfer, or TEA* asserted and TA* asserted on any subsequent transfer after the first transfer, results in a transfer termination with an error acknowledge indication. If an error acknowledgment is asserted on the first data transfer of a burst bus cycle, the entire burst operation is aborted, and the bus error exception is taken. However, if the error acknowledgment is asserted on a later, subsequent transfer of a burst bus cycle, the bus error exception may or may not be taken, depending on whether an attempt to use the particular data associated with the error indication is actually made by the primary master 10. That is, the bus error exception will be taken if and only if an attempt is made by the primary master 10 to actually use the data associated with the error acknowledgment. Also, an error acknowledge response does not affect the error status of any previously transferred longwords of a burst bus cycle. An error acknowledge response, however, does prevent a cache update on a line read.

A slave indicates a need for a retry of the bus cycle by the assertion of TRA* without the assertion of TEA*, if the part is operating in a preferred Acknowledge Termination Mode. If the part is operating in family-compatible Acknowledge Termination Mode, assertion of TEA* and TA* simultaneously will signal a retry acknowledge indication. A retry acknowledgment is only possible on the first transfer of a bus cycle. Independent of whether the transfer is a byte, word, longword or first longword of a burst cycle, the primary master 10 may or may not retry the bus cycle depending on the internal state of the processor. If a retry acknowledgment is asserted on subsequent transfers of a burst bus cycle, the primary master 10 will ignore the retry request if it is in preferred Acknowledge Termination Mode; or, will immediately terminate the bus cycle as being error acknowledged if it is in family-compatible Acknowledge Termination Mode. In bus cycles which terminate with the assertion of a retry acknowledgment, the cache will not be updated. Any portion of a locked sequence can be retried.

The bus protocol of FIG. 1 also has a Cycle Longword Address (CLA*) feature. The primary master 10 provides a Cycle Longword Address feature, controlled by the CLA* input signal. CLA* controls the cycling/non-cycling of A[3:2] during a bus cycle. The assertion of CLA* in a bus cycle on any clock edge at anytime after the clock period when Transfer Start (TS*) is asserted will cause the longword address, or base address, to increment in circular wrap-around fashion each time it is asserted until the bus cycle is complete. Circular wrap-around fashion means that the bits A[3:2] will cycle in the following order: 00, 01, 10, 11, 00, 01, etc.. It is important to also note that the bits A[3:2] do not have to begin in the 00 state. If CLA* is negated during a bus cycle, A[3:2] will remain fixed with its value throughout the duration of the bus cycle. CLA* aids in supporting burst bus cycles by slaves which cannot perform burst features but must transfer one long word at a time. A burst bus cycle is used when more than one longword needs to be transferred within the bus cycle. CLA* also proves useful for certain high speed DRAM systems which can take advantage of cycling the longword offset a clock before the DRAM has transferred data and acknowledged the transfer.

The system of FIG. 1 is fully disclosed above, but to further understand the bus protocol used by FIG. 1, several timing diagrams and further explanation is provided below. The Cycle Longword Address (CLA*) feature of the bus protocol, illustrated via FIG. 1, is a further discussed below.

The CLA* control signal in FIG. 1 allows a processor or bus master to be used with synchronous random access memories (RAMs) without building an external circular counter to cycle the longword address provided by the bus master. The CLA* signal also may be used with dynamic random access memories (DRAMs) to pre-cycle the longword address provided external to the bus master. The CLA* signal is used to alleviate a need for an external longword address cycle circuit when a processor is used with synchronous RAMs. The CLA* signal is also used for saving one clock per data transfer for certain DRAM implementations (the longword address can be pre-incremented one clock before the DRAM system return a Transfer Acknowledge (TA*) signal thereby saving the one clock cycle).

The CLA* signal gives external hardware the ability to cycle (or increment) the longword address bits A[3:2] each time the CLA* input is asserted. During burst bus cycles where the primary master 10 would normally hold the longword address fixed, CLA* can be asserted to cause the processor to increment A[3:2] in a circular fashion and allows this action to be totally controlled by external hardware. Typically, the CLA* input would be connected to the Transfer Acknowledge (TA*) signal which indicates to the processor the current transfer is complete. For this external connection of TA* connected to CLA* the longword address can be easily incremented so the primary master 10 can be interfaced to synchronous RAMs.

If the CLA* is asserted one clock before TA* is asserted, then the longword address will be advanced one clock before the TA* is asserted and data is transferred. This use of CLA* allows page-mode DRAMs to be interfaced to the processor to achieve increased data transfer rates. It is therefore possible to save one clock per transfer with this type of memory because the DRAM has already internally latched the row address so that the processor can have the next longword (or in DRAM terminology, the next column address) already setup and be indexing into the DRAM for the next access while the prior addressed data is being transferred between the processor and DRAM. This is a pipeline effect which improves the performance for this type of DRAM system.

Figure 2:
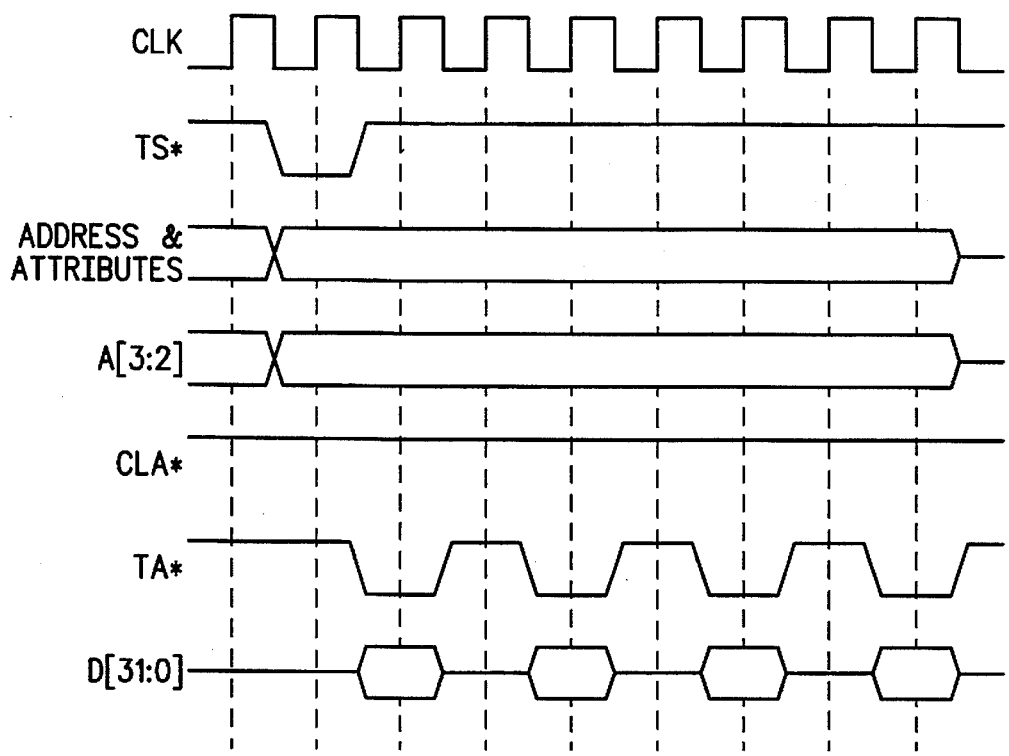
FIG. 2 illustrates, in a timing diagram, a bus protocol used to indicate that a longword address is not to be cycled in accordance with the present invention.
Figure 3:
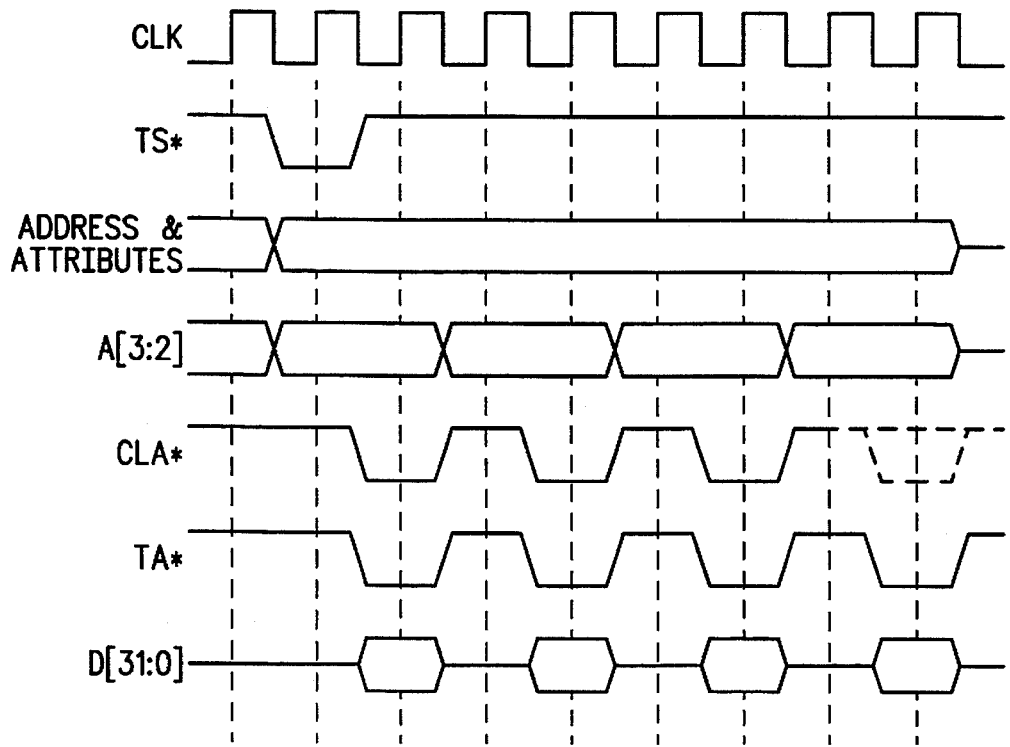
FIG. 3 illustrates, in a timing diagram, a bus protocol used to indicate that a longword address is to be cycled in accordance with the present invention.

The primary master 10 also provides an internal counter which can be configured to assert an output pin which can be connected to CLA* to perform this operation automatically without the need for external hardware. FIG. 2 illustrates an example of the operation of the synchronous primary master bus performing burst transfers without CLA* being asserted. FIG. 3 illustrates an example of the operation of the synchronous primary master bus performing burst transfers with CLA* asserted at various times during the burst bus cycle. Note the behavior of A[3:2] when CLA* is asserted. When CLA* is asserted the address bits A[3:2] cycle or increment in a circular fashion through four binary states as indicated in FIG. 3. The burst bus cycle of FIG. 3 is intended to transfer four potentially different longword data values as illustrated. It is important to note that the incrementing/changing of the A[3:2] bits may be a straight binary increment, a gray scale increment, or any state machine which cycles in some manner through the binary values 11, 10, 01, and 00. FIG. 2 indicates that if he CLA* bit is not asserted, the bits A[3:2] maintain the same value throughout the burst bus cycle.

Figure 4:
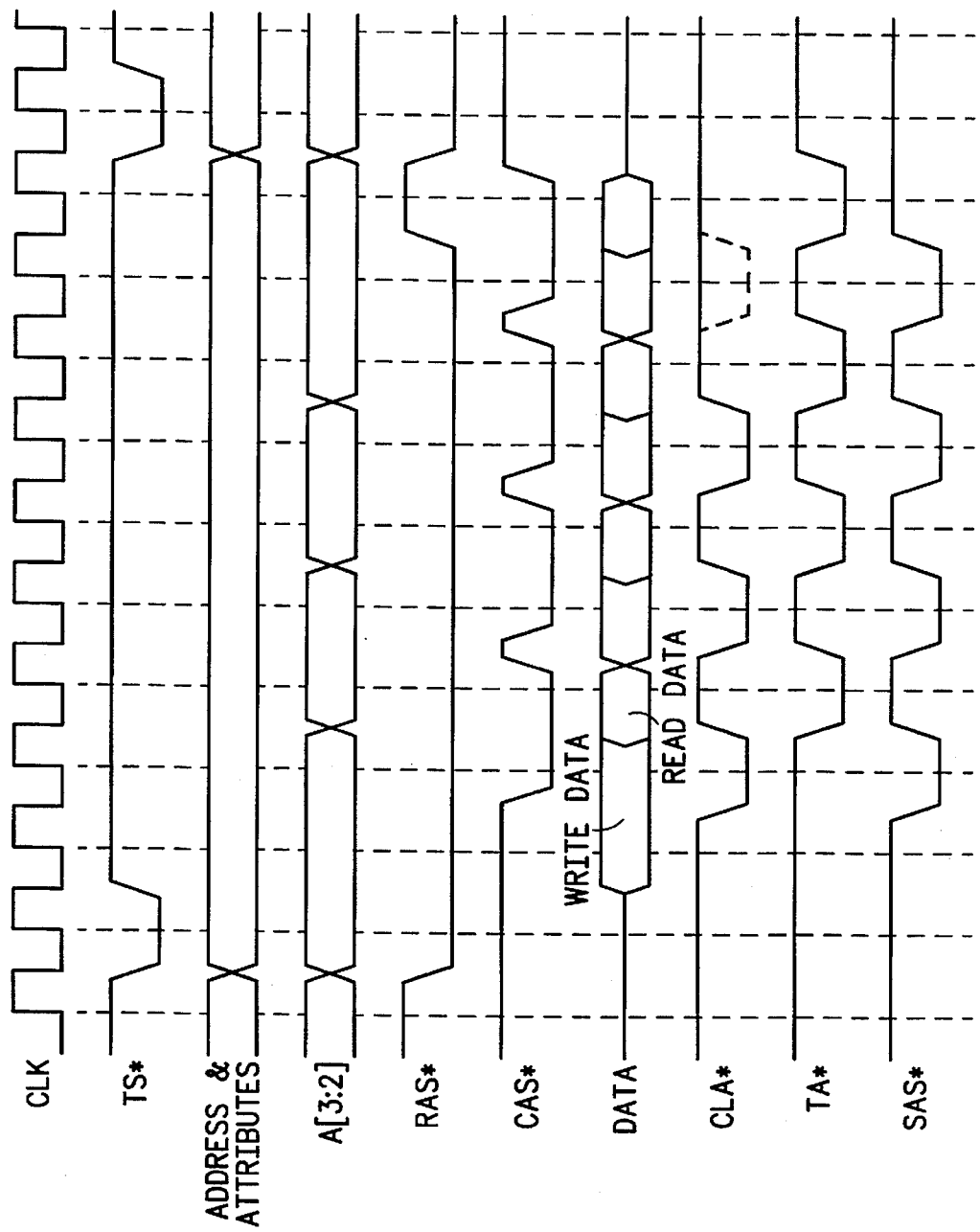
FIG. 4 illustrates, in a timing diagram, a bus protocol wherein sampling of bus ownership termination signals (TRA*, TA*, TEA*) is delayed and the sampling is indicated via a control signal (SAS*) after the delay period in accordance with the present invention.

FIG. 4 illustrates in a timing diagram how the CLA* signal is used to interface the primary master 10 to a DRAM memory. The use of CLA* saves having to design external counters or glue logic to provide the circular wrap-around increment capability and thus simplifies the circular wrap-around increment task. At very high frequencies, with the on-to-off chip delays, the creation of external logic to provide this circular wrap-around functionality may be difficult if not impossible to accomplish.

Additionally, with the proper connection of CLA* to various signals to/from the primary master 10, the assertion and negation of CLA* as in FIG. 3, and therefore the incrementing of the bits A[3:2], can be made automatic. The CLA* signal shifts the burden of cycling the longword address from external logic to internal to the primary master 10 (automatic from an external logic point of view) and does not require external counters or glue logic (which are typically performance inhibiting). In summary, CLA* allows cycling and pre-cycling of longword addresses to be trivial and automatic, and yields higher performance and allows the use of higher bus frequencies than that achieved by known external glue logic.

Figure 5:
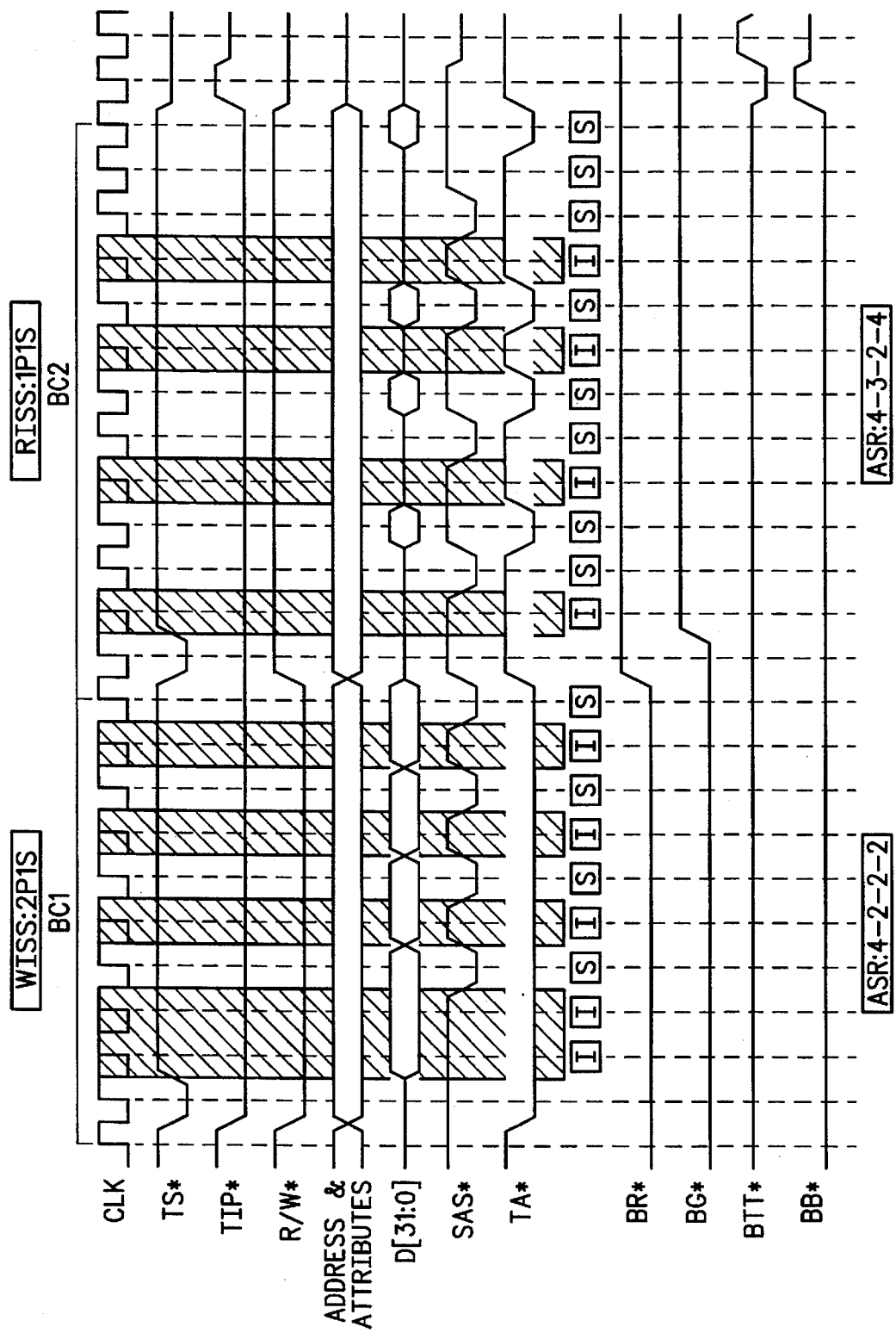
FIG. 5 further illustrates, in a timing diagram, a bus protocol wherein sampling of bus ownership termination signals (TRA*, TA*, TEA*) is delayed and subsequently enabled via a control signal (SAS*) in accordance with the present invention.

The SAS* signal is further illustrated in FIG. 5. SAS* is used to solve the known problem of being able to indicate when the primary master 10 samples or changes data and samples transfer acknowledgments (TA*, TEA*, and TRA*). The SAS* signal also provides a solution for automatically cycling longword addresses during burst transfers, and provides a way of generating transfer acknowledgments after the ignore state count of the primary master 10 has depleted (i.e., been decremented to zero). The SAS* signal indicates times at which the primary master 10 will start sampling transfer acknowledge-type inputs which may otherwise be unknown to external logic. Additionally, this mechanism can be used to generate transfer acknowledgments beyond the preconfigured ignore state settings of the primary master 10, and can also be coupled to a Cycle Longword Address (CLA*) input to pre-cycle the longword address during burst transfers.

The primary master 10 incorporates an ignore (transfer acknowledge-type inputs) state feature with an indication when its internal ignore state counter has counted down to zero causing the primary master 10 to start sampling transfer acknowledge-type inputs. When the ignore state counter reaches zero the Start Transfer Acknowledge Sampling (SAS*) output is asserted for one clock period. If the primary master 10 is configured to operate in an auto-transfer acknowledge mode where TA* is continuously asserted, there will be no external indication as to when the primary master 10 will begin to start sampling the acknowledge inputs or start sampling or changing data for read or write operations, except by means of the SAS* signal. The purpose of the SAS* signal is to provide external indication of times when data is actually transferred and acknowledged for systems incorporating automatic transfer acknowledgments. The SAS* signal aids in the debugging of new system designs using the primary master 10. Additionally, the SAS* output can be directly connected to the CLA* input on the primary master 10 to pre-cycle or cycle the longword address (A[3:2]) and provide automatic longword address incrementing for DRAM or SRAM systems without the need for external glue logic or counters. SAS* can also be registered through one or more chained D flip-flops to easily produce transfer acknowledgments beyond the extent of ignore state count values.

FIG. 5 illustrates specifically the SAS* mechanism. To lend clarity to FIG. 5, several cross-hatched rectangular regions shading have been used to show Ignore State times, Sample Period times, and Don't Care conditions. Small squares located on clock (CLK) edges in FIG. 5 containing the character 'I' indicate ignore state clock edges wherein termination acknowledge-type inputs are not sampled and therefore ignored. Small squares located on clock edges in FIG. 5 containing the character 'S' indicate sample state clock edges wherein termination acknowledge-type inputs are sampled. Each bus cycle is labeled with a 'BC#' label wherein '#' is a number (i.e., 1, 2, 3, etc.) so particular bus cycles can be referenced in the text. A small rectangles with an RISS (Read Ignore State Setting) or WISS (Write Ignore State Setting) value is used to show the Ignore State Settings. For example, an RISS value of '2P1S' is used to denote the Primary Ignore State is set to 2 clocks while all Subsequent Ignore States are set to 1 clock for read cycles as discussed previously.

Each of the two bus cycles in FIG. 5 also has associated with it a small rectangle with an ASR (Actual Slave Response) value to show a slave's actual response which may be different than the Ignore State Settings. An ASR value of 5-1-1-1 indicates a slave device responds to a burst access with 4 primary wait states before data is transferred while all subsequent transfers incur 0 wait states.

In FIG. 5, a line push burst cycle (BC1) followed by a line read burst bus cycle (BC2) is illustrated. Bus Cycle 1 (BC1) is an example of a line push burst bus cycle with TA* asserted for all of the burst with the sampling of TA* controlled by the internal Ignore State Settings. The cross-hatched vertical regions are ignored periods denoted on clock edges with an 'I' enclosed in a small square. The non-cross-hatched regions are sample periods denoted on clock edges with an 'S' enclosed in a small square and show that the transfer acknowledge signals (TA*, TRA*, TEA*) are being sampled by the primary master 10 even though the signals (TA*, TRA*, TEA*) themselves may not yet actually be asserted (i.e. may be negated to insert wait states).

Bus Cycle 2 (BC2) of FIG. 5 is an example of a read burst bus cycle with TA* asserted with extra wait states beyond the internal Ignore State Settings. Note in particular, the operation of SAS*. In Bus Cycle 1, TA* is continuously asserted and SAS* denotes times when the Transfer Acknowledge (TA*) signal is sampled and when data D[31:0] is valid and will subsequently change. In Bus Cycle 2, SAS* again indicates times when transfer acknowledgment signals (TA*, TRA*, TEA*) are starting to be sampled, but note in this bus cycle (BC2), that external logic asserts the transfer acknowledgment after the ignore state counter has reached zero (i.e., after SAS* is asserted).

Figure 6:
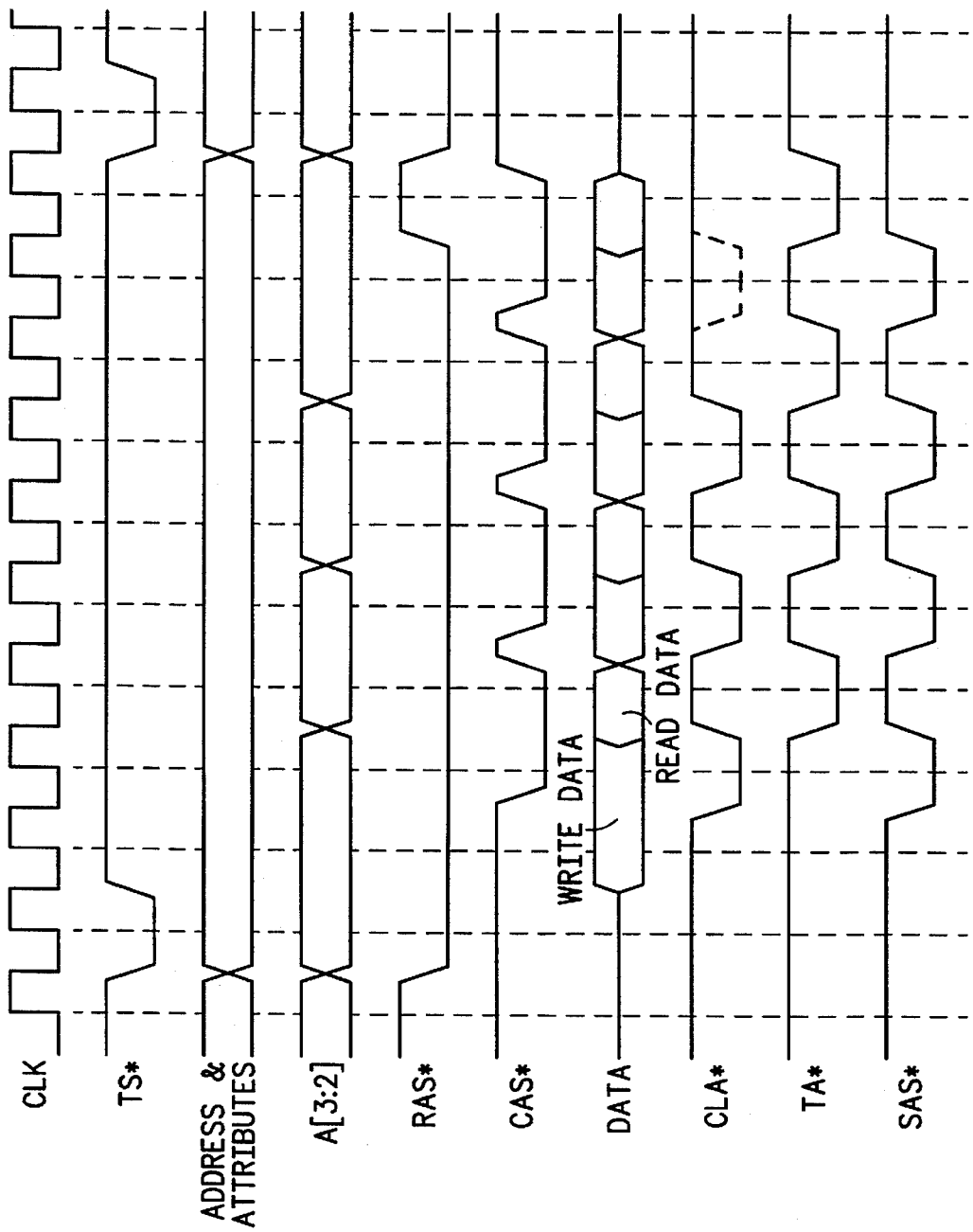
FIG. 6 illustrates, in a timing diagram, the cycle longword address (CLA*) ability, the start acknowledge sampling (SAS*), and the delay (i.e., ignore states) in acknowledge sampling in accordance with the present invention.

FIG. 6 illustrates bus cycle behavior if SAS* is connected to the primary master's CLA* input to yield higher system performance when the system 10 is used with page mode DRAMs. The higher performance is achieved by allowing SAS* to pre-cycle the longword address one clock before data is actually transferred.

Figure 7:
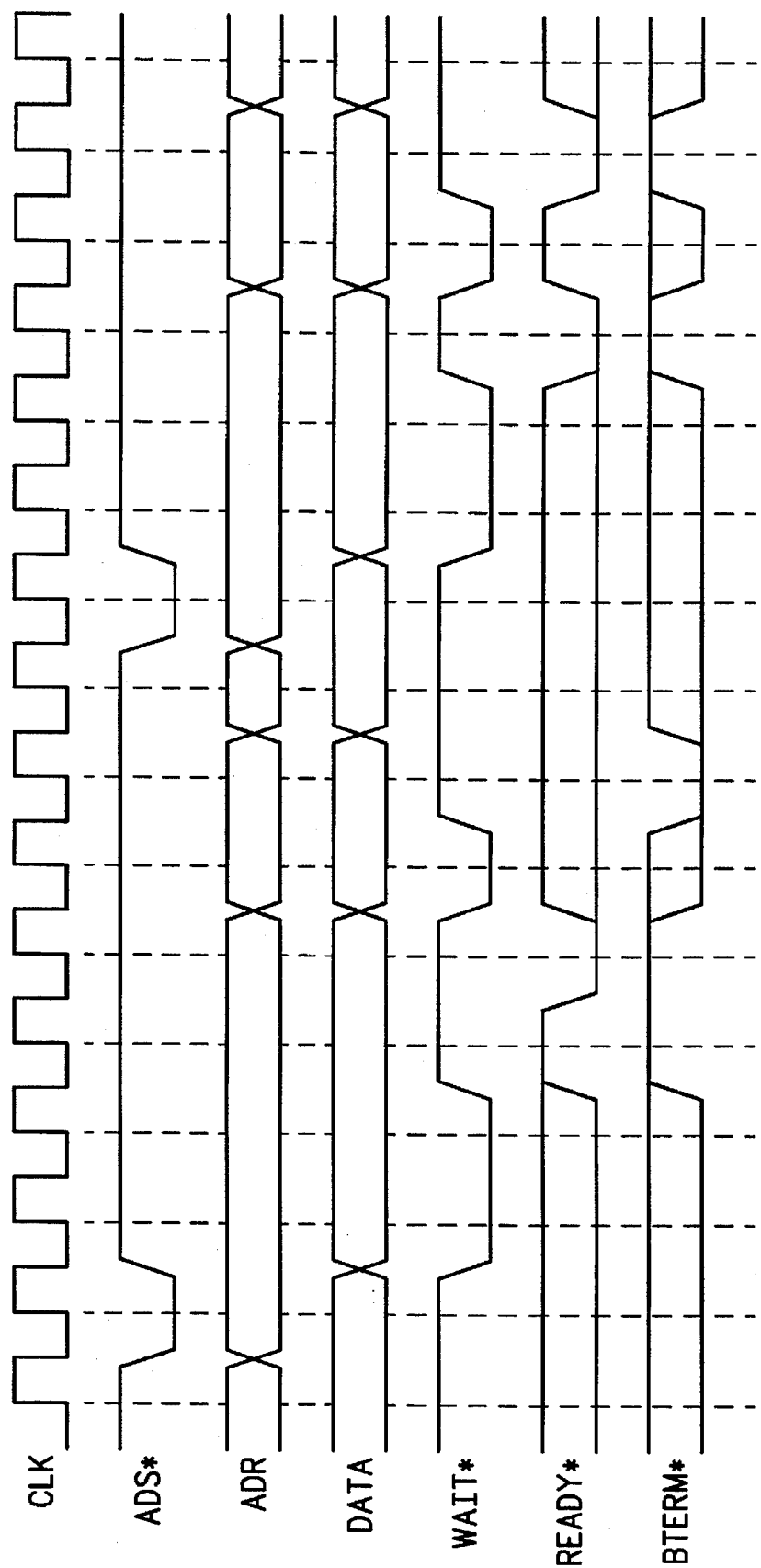
FIG. 7 illustrates, in a timing diagram, a known bus protocol which does not have the advantages of the bus protocols in FIGS. 1–6.

Known processors, see FIG. 7, provide a WAIT signal which is used to indicate the status of an internal wait state generator, but the WAIT signal is asserted for the whole of the time the internal wait state generator is causing the wait states and not when the wait states are being caused by the READY or BTERM signals. WAIT may be negated for several clocks before or between transfers and cannot be used in similar ways SAS* can be used to cycle longword addresses or generate Transfer Acknowledgments which occur after the ignore state count has been depleted (i.e., decremented to zero). FIG. 7 shows the operation of the WAIT signal in the known processor. Note that the known operation of WAIT signal is very different from the SAS* signal of FIGS. 5-6. For example, the SAS* signal in FIGS. 5-6 is asserted only for a maximum of one clock period per data transfer unlike the WAIT signal. The incorporation of the SAS* signal into the bus protocol of FIG. 1 allows for reduced external logic and allows for the use of higher bus frequencies.

Figure 8:
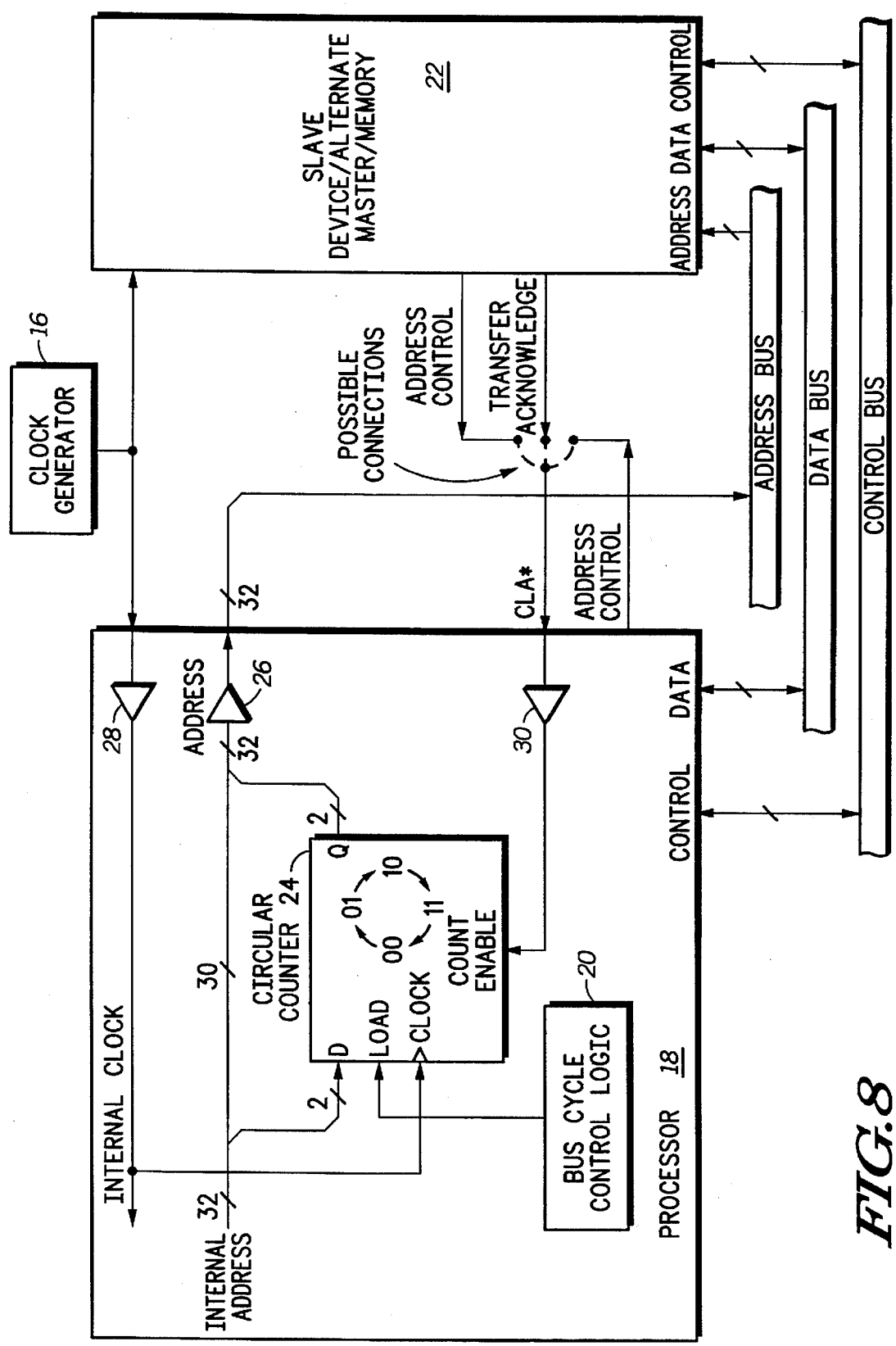
FIG. 8 illustrates, in a block diagram, a system which is used to provide a cycle longword address (CLA*) function within a data processing system in accordance with the present invention.

FIG. 8 illustrates, in more detail, a system used to implement the CLA* feature, discussed above, in a data processing system. FIG. 8 illustrates a processor 18 which may be either the primary master 10 or the alternate master 12. A slave device/alternate master/memory 22 is any peripheral device with which processor 18 is to communicate. The clock generator circuit 16 is illustrated in FIGS. 1 and 8 and is used to generate an internal clock (CLK) for the processor 18 and slave device 22. Input buffer 28 is used to provide the internal clock (CLK) signal. A bus control logic circuit 20 is used to control the loading of a circular counter 24.

In FIG. 8, the circular counter 24 is used to cycle address bits of the internal address, or base address, in a circular fashion as illustrated. In a preferred form, counter 24 cycles only the bits A[3:2] in response to the externally provided CLA* signal. The output buffer 26 provides the address bits external to the processor 18 and the input buffer 30 provides the CLA* signal to the counter 24. The address bus, data bus and control bus of FIG. 1 are illustrated at the bottom of FIG. 8. The CLA* signal is connected external to the processor 18 in one of three possible manners. These three ways are illustrated via dashed lines in a region referred to as "possible connections". One of the three possible connections is required in FIG. 8 to generate the CLA* signal.

Figure 9:
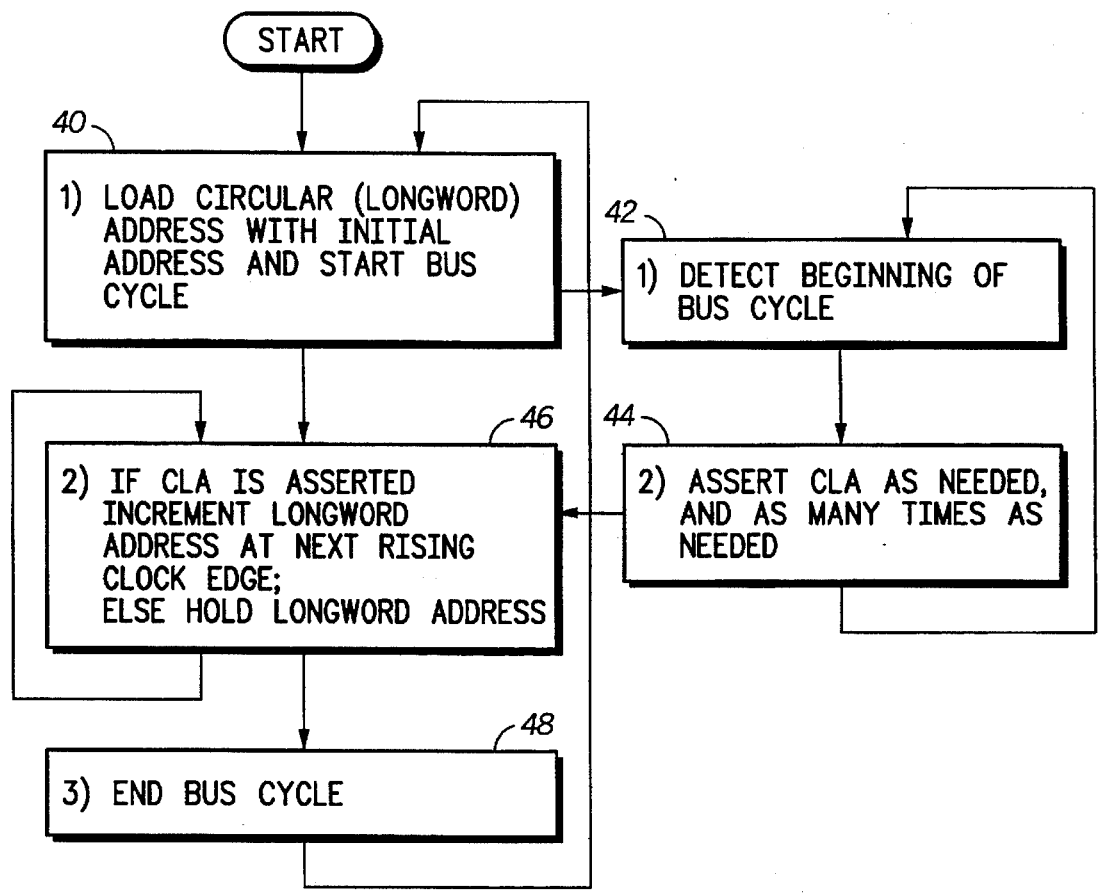
FIG. 9 illustrates, in a state flowchart, a process by which a cycle longword address (CLA*) function is performed in the data processing system of FIG. 8.

In FIG. 9, a flow diagram is used to illustrate how the CLA* feature operates. The boxes or steps listed to the right of FIG. 9 are performed by the processor 18 or the primary master 10. The boxes or steps to the left of FIG. 9 are performed preferably by an external device such as an alternate master, a peripheral device, a memory etc., although the processor 18 or the primary master may also perform the steps to the right of FIG. 9, as indicated.

In FIG. 9, the processor 18 begins by loading the circular counter 24 with an initial group of address bits in a step 40. The processor 18 then begins a bus cycle within the data processing system. A bus cycle may begin, for example, with the assertion of the TS* signal. An external device detects the beginning of the bus cycle in a step 42. If more than one data value is being read or written in a sequential burst fashion, then the CLA* signal is asserted then deasserted in a sequential manner any number of times in a step 44. The processor 18 detects any assertion of the CLA* signal and increments or cycles the address bits in the counter 24 in a circular manner in a step 46. If CLA* is not asserted, the processor 18 does not alter the address bits in the counter 24. Once all of the data is communicated for the particular bus cycle, the bus cycle is ended via a step 48.

Figure 10:
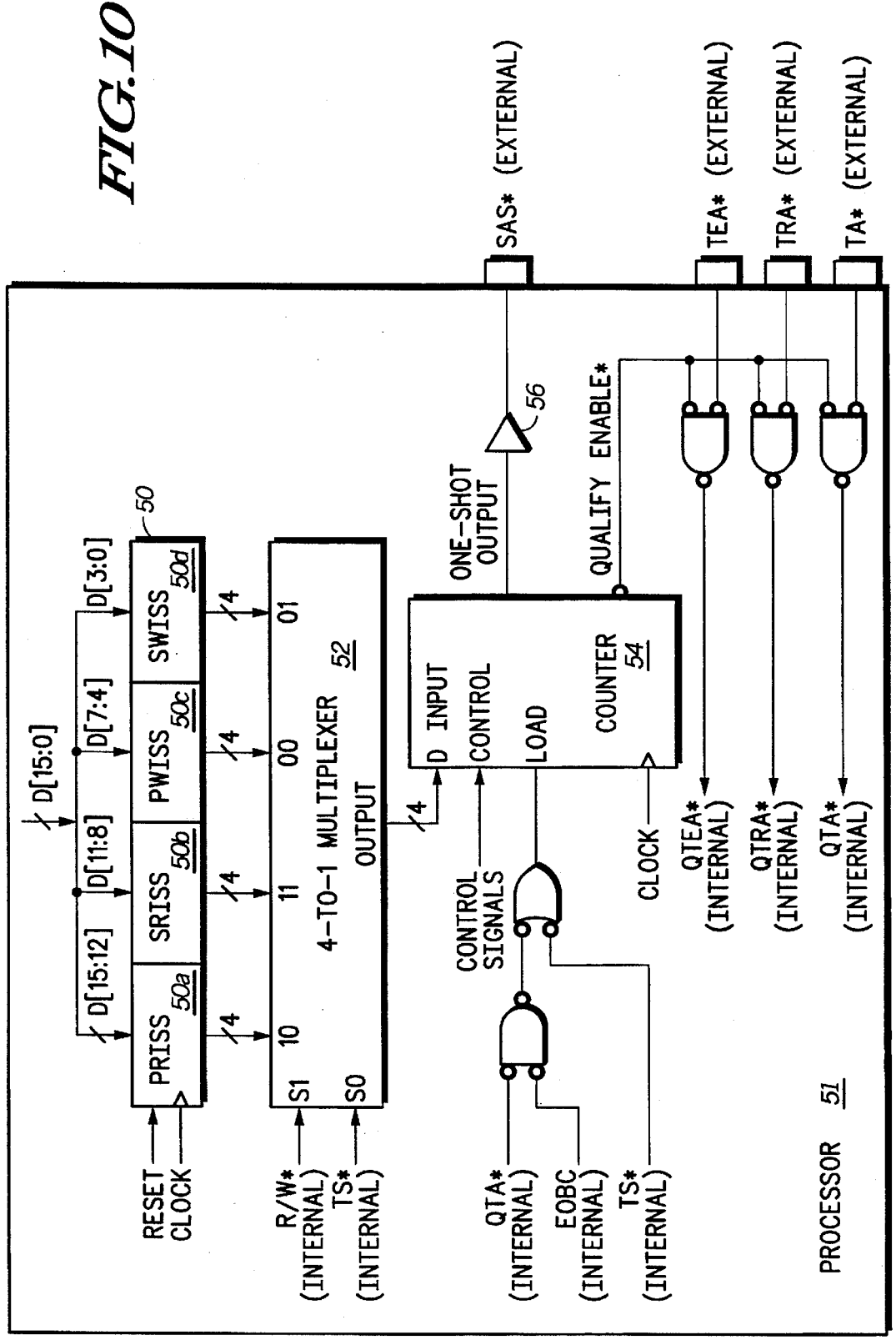
FIG. 10 illustrates, in a block diagram, a system which is used to provide a start acknowledge termination sampling (SAS*) within a data processing system in accordance with the present invention.

FIG. 10 illustrates a system used to perform a start acknowledge termination sampling (SAS*) function in a data processing system. FIG. 10 illustrates data input lines D[15:0] which load a register 50 internal to the data processing system upon reset. The enable signal of the register 50 allows register 50 to be loaded from the date bus D[15:0] upon reset. The register 50 is split into four 4-bit portions referred to a portions 50a through 50d. Portion 50a is labeled PRISS (primary read ignore state settings) which means that the four bit value stored in portion 50a is used to determine a number of ignore state clock cycles for a primary read. Portion 50b is labeled SRISS (secondary read ignore state settings) which means that the four bit value stored in portion 50b is used to determine a number of ignore state clock cycles for a secondary read which is a read occurring after the primary read in a burst bus cycle. Portion 50c is labeled PWISS (primary write ignore state settings) which means that the four bit value stored in portion 50c is used to determine a number of ignore state clock cycles for a primary write bus operation. Finally, portion 50d is labeled SWISS (secondary write ignore state settings) which means that the four bit value stored in portion 50d is used to determine a number of ignore state clock cycles for a secondary write. It should be noted that more or less than four bits may be used for the count values in FIG. 10.

In FIG. 10, a 4-to-1, 4 bit wide, multiplexer (MUX) 52 has as inputs each of the four 4-bit values from register 50. The selector inputs, R/W* and TS*, determine which of the 4 portions 50a through 50d are chosen as the 4-to-1, 4 bit wide, MUX output. The 4-to-1, 4 bit wide, MUX output is connected to the input of a counter 54. Counter 54 is a 4-bit counter which is used to count down from the value provided by the 4-to-1, 4 bit wide, MUX 52 to zero. The counter 54 is loaded based upon a load signal (LOAD) which is a function of QTA* (qualified transfer acknowledge [internal signal]), EOBC (end of bus cycle [internal signal]), and TS* (transfer start [internal signal]). A qualified transfer termination signal means that the signal is not being ignored, whereas an unqualified signal is a signal that is ignored. From the time the counter 54 is loaded to the time the counter 54 reaches zero, the TA*, TRA*, and TEA* signals are being ignored (i.e., the ignore states are active). The signals are ignored via a disabled qualify enable signal which disables the TA* signal, TRA* signal, TEA* signal, and any other termination signal. Once the counter 54 reaches zero, the SAS* signal is asserted in a one-shot pulse fashion and SAS* is provided external to the processor via an output buffer 56. Once SAS* is asserted, the sampling of the TA*, TRA*, and TEA* signals begins.

Once the SAS* signal is asserted the qualify enable signal (QE) is asserted and stays asserted to qualify the TA* TEA* and TRA* inputs to qualified signals QTA*, QTRA*, and QTEA* as illustrated in FIG. 10 until at least one of the QTA*, QTEA*, and/or QTRA* signals becomes asserted.

Figure 11:
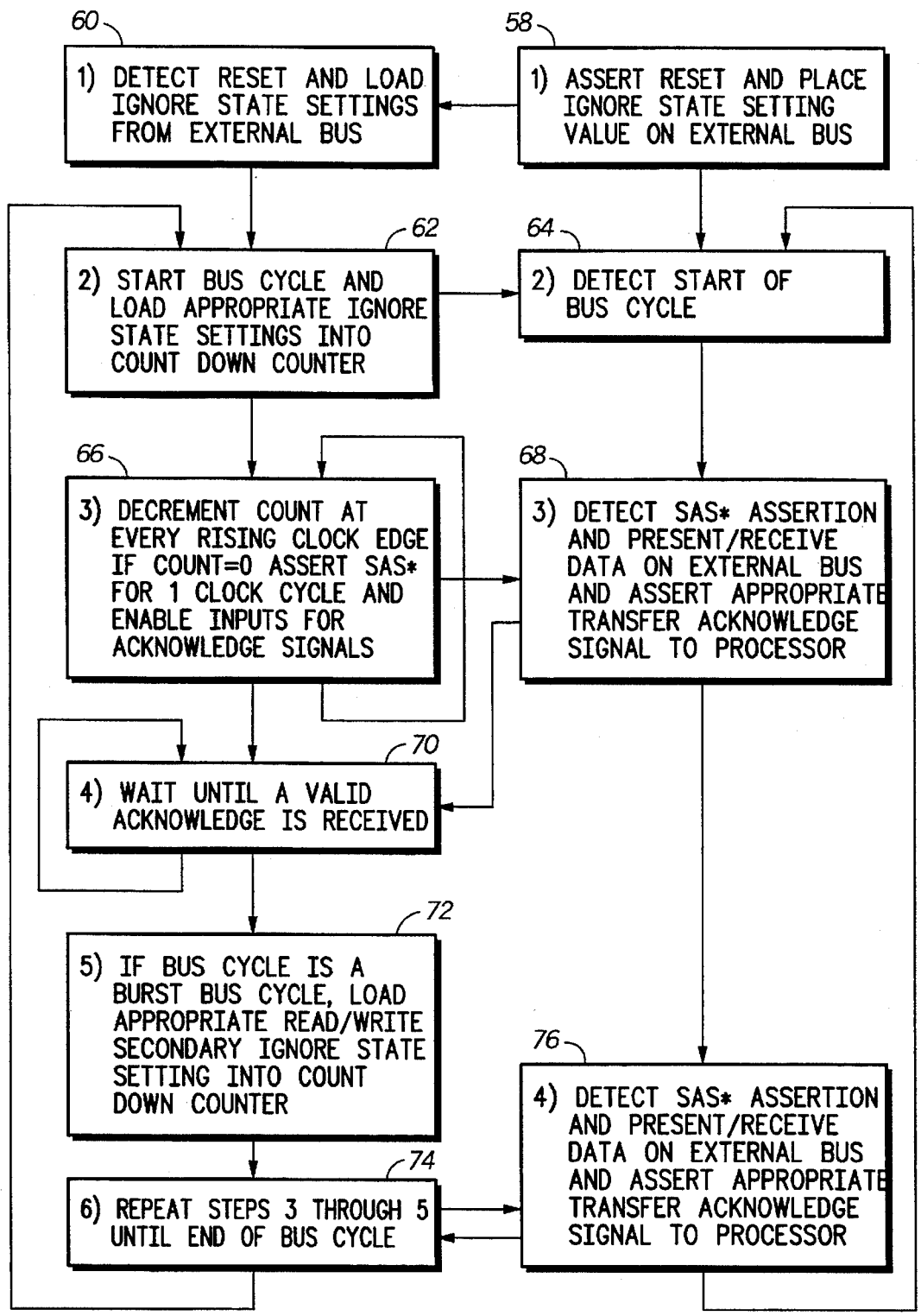
FIG. 11 illustrates, in a state flowchart, a process by which a start acknowledge termination sampling (SAS*) function is performed in the data processing system of FIG. 10.

FIG. 11 illustrates a flow diagram for the SAS* feature and ignore states discussed above. The boxes or steps listed to the right of FIG. 11 are performed by the processor 51 of FIG. 10 or the primary master 10 of FIG. 1. The boxes or steps to the left of FIG. 11 are performed preferably by an external device such as an alternate master, a peripheral device, a memory etc., although the processor 18 or the primary master 10 may also perform the steps to the right of FIG. 11, as indicated.

FIG. 11 illustrates a step 58 wherein a reset is generated anywhere within the data processing system. In a step 60 the reset is detected and the register 50 is loaded from the data bus D[15:0]. In a step 62, the processor 51 begins a bus cycle and loads the counter 54 with the appropriate count from register 50 based upon the type of bus cycle and data transfer being performed. In a step 64, the external device detects that the bus cycle is to begin. In a step 66, the counter 54 is decremented with each clock cycle (i.e., rising edge of the clock cycle, preferably) to decrement the count towards zero. Once a count value of zero is reached, SAS* is asserted by the processor 51 and the SAS* signal may be detected in a step 68 by the external device in order to enable a termination acknowledgment signal (TA*, TRA*, TEA*). At least one of the TA*, TRA*, and TEA* signals are asserted by the external device in the step 68 when the external device is ready to terminate the bus cycle. In a step 70, the processor 51 begins sampling the TA*, TRA*, and TEA* signals waiting for one of the transfer termination signals to be asserted. If the bus cycle involves a burst bus transfer, then a steps 72 and 74 are used to transfer multiple addresses and multiple data values while step 76, which is similar to step 68, is performed by the external device. The bus cycle terminates when all data for the bus cycle is transferred.

While the present invention has been illustrated and described with reference to specific embodiments, further modifications and improvements will occur to those skilled in the art. For example, the CLA* signal could be designed to circular wrap or increment other address bits or a number of address bits greater than or less than 2 (e.g. A[0:1], A[2:4], A[2], etc.) As used herein, two addresses are adjacent in address space when, for example, the longword address AF24 (in hexadecimal) is compared to AF28 (in hexadecimal) because AF24 and AF28 differ in address bits (i.e. address space) by one longword value. AF24 and AF2B are not directly adjacent since there is more than one longword separating the two addresses in address space. It is also possible to use ignore states for any input to a microprocessor rather than just bus transfer termination bits. It is to be understood, therefore, that this invention is not limited to the particular forms illustrated and that it is intended in the appended claims to cover all modifications that do not depart from the spirit and scope of this invention.

What is claimed is:

1. A method for controlling an external address of a data processor during a burst bus cycle wherein a plurality of data values are sequentially transferred between the data processor and circuitry external to the data processor, the data processor having an external input for receiving a control signal generated by the circuitry external to the data processor, the method comprising the steps of:

(a) providing, via the data processor, a base address external to the data processor via an external bus coupled to the data processor, the base address having N bits wherein N is a finite integer greater than one;

(b) receiving, via the circuitry external to the data processor, a first asserted control signal which is input to the external input;

(c) altering, within the data processor, only M bit(s) of the base address to form another address, the another address being derived from the base address, being unequal to the base address and being formed via circuitry internal to the data processor in response to the assertion of the first control signal, M being a finite integer which is less than N but greater than zero; and (d) repeating steps (b) and (c) a predetermined number of times to access a plurality of memory locations in the circuitry external to the data processor.

2. The method of claim 1 wherein the base address comprises at least four bits (N≧4) denoted as A[L:0]

wherein L is a finite integer greater than zero such that N−1 is equal to L and N is the total number of bits in the base address, A[L] being a most significant bit of the base address and A[0] being a least significant bit of the base address, the step (c) comprising:

altering only the bits A[3:2] of the base address to form the another address.

3. The method of claim 1 wherein the step (c) comprises:

altering at least two bits in the base address in a circular manner wherein the at least two bits cycle in a circular manner through a series of binary values 00, 01, 10, and 11 wherein a first value in the series is any one of the binary values 00, 01, 10, and 11.

4. The method of claim 1 wherein the circuitry external to the data processor is a memory circuit selected from the group consisting of: dynamic random access memory (DRAM), static random access memory (SRAM), and random access memory (RAM).

5. The method of claim 1 wherein the step (a) further comprises:

communicating the base address to the circuitry external to the data processor via the external bus.

6. The method of claim 1 wherein the data processor has an external pin which is used to receive a second control signal from external to the data processor, the second control signal being coupled to the first control signal and being used to terminate a bus cycle so that the step (c) further comprises:

automatically terminating, via the second control signal, a previous bus cycle transfer.

7. A method for controlling an external address of a data processor during a burst bus cycle wherein a plurality of data values is sequentially transferred between the data processor and circuitry external to the data processor, the data processor having an external input for receiving a control signal generated by the circuitry external to the data processor, the method comprising the steps of:

(a) providing, via the data processor, a base address external to the data processor via an external bus coupled to the data processor, the base address having N bits wherein N is a finite integer greater than four, the base address having a most significant bit position A[N−1] and a least significant bit position A[0];

(b) reading a data value from a memory location corresponding to the base address, the memory location being located within the circuitry external to the data processor;

(c) asserting, via the circuitry external to the data processor, a first control signal which is input to the external input of the data processor;

(d) incrementing at least one existing bit within the base address to form a new base address, the new base address being different from and replacing the base address, the new base address being generated by circuitry internal to the data processor in response to the assertion of the first control signal; and (e) repeating steps (b) through (d) M number of times wherein M is a finite integer grater than one.

8. The method of claim 7 wherein the step (b) further comprises:

reading the data value as a 32-bit longword data value.

9. The method of claim 7 wherein M is equal to four and the steps (b) through (d) are repeated four times wherein step (b) comprises:

reading a total of four data values from the circuitry external to the data processor in the burst bus cycle.

10. The method of claim 7 wherein the step (b) further comprises:

reading the data value as an L-bit data value wherein L is a finite integer greater than zero.

11. The method of claim 7 wherein the base address comprises at least four bits denoted as A[L:0] wherein N−1 equals L and N is the total number of bits in the base address, A[L] being a most significant bit of the base address and A[0] being a least significant bit of the base address, the step (d) comprising:

incrementing, in a circular manner, only the bits A[3:2] of the base address to alter the base address to another longword address.

12. The method of claim 7 wherein the base address comprises at least four bits denoted as A[L:0] wherein N−1 is equal to L and is the total number of bits in the base address, A[L] is a most significant bit of the base address and A[0] is a least significant bit of the base address, the step (d) comprising:

incrementing only the bits A[3:2] of the base address by adding a logical one value to the bit A[2] wherein if a logic one value is added to A[2] when A[3:2] is equal to binary 11 before the addition, then A[3:2] becomes binary 00, the incrementing being used to alter the base address to another longword address.

13. The method of claim 7 wherein the step (d) further comprises:

incrementing the base address to a new address wherein the new address represents a longword memory location directly adjacent the longword location corresponding to the base address in terms of address space.

14. The method of claim 7 wherein the step (c) comprises:

altering at least two bits in the base address in a cyclical manner wherein the at least two bits cycle in a circular manner through the binary values 00, 01, 10, 11.

15. A data processing system having a bus protocol for controlling a bus within the data processing system, the data processing system comprising:

a primary master having an input for receiving a control signal, the primary master incrementing an N-bit first address provided on the bus in a circular manner to an N-bit second address in response to assertion of the control signal wherein the N-bit first address is different from the N-bit second address by only M bits wherein M is less than N, the second address being directly derived by the primary master from the first address within the primary master;

a slave device coupled to the primary master by the bus, the slave device having an output for providing the control signal to the primary master, the control signal being asserted by the slave device in response to receiving an address from the primary master in a burst bus cycle; and a bus arbiter coupled to the primary master for determining ownership of the bus within the data processing system.

16. The data processing system of claim 15 wherein the control signal is asserted at least three different times during a burst bus transfer between the slave device and the primary master, wherein the at least three different times are sequential and mutually exclusive.

17. The data processing system of claim 15 wherein the first address comprises at least four bits denoted as A[N−1:0] wherein N is the total number of bits in the first address and A[N−1] is a most significant bit of the first address and A[0] is a least significant bit of the first address, the primary master altering only the bits A[2:3] of the first address in order to derive the second address from the first address.

18. The data processing system of claim 15 wherein the first address and the second address correspond respectively to different 32-bit longword addresses.

19. The data processing system of claim 15 wherein the primary master alters at least two bits in the base address in a circular manner to form a circular binary cycle wherein the at least two bits cycle through the binary values 00, 01, 10, and 11, a first value of the circular binary cycle being selected from a binary number group consisting of: 00, 01, 10, and 11.

20. The data processing system of claim 15 wherein the slave device is further defined as being a memory circuit selected from the group consisting of: dynamic random access memory (DRAM), static random access memory (SRAM), and random access memory (RAM).

21. A method for controlling an external address of a data processor, the method comprising the steps of:
(a) storing a base address via a register internal to the data processor;
(b) providing the base address external to the data processor via external terminals of the data processor wherein a memory device external to the data processor provides a data value in response to the providing of the base address;
(c) generating a processor control signal internal to the data processor;
(d) providing the processor control signal to the register to indicate to the register that a sub-set of bits in the base address are to be changed in state to obtain a new base address as the base address within the data processor;
(e) performing steps (b) through (c) a plurality of times to receive a plurality of data values from the memory device.

22. The method of claim 21 wherein the register is coupled to an external input terminal of the data processor wherein the external input terminal is used to receive a register control signal which, when asserted, indicates that the base address is to change state as in step (d), an external output terminal of the data processor wherein the external output terminal provides the processor control signal, wherein the external output terminal is coupled to the external input terminal such that the processor control signal is conducted through the external output terminal to the external input terminal to function as the register control signal.

23. The method of claim 22 wherein the processor control signal is asserted in response to a control timer achieving a time-out value, the control timer being internal to the data processor.

24. The method of claim 21 wherein the processor control signal is asserted in response to a control timer achieving a time-out value, the control timer being internal to the data processor.

25. The method of claim 21 wherein the register is a counter wherein only the four lowest order bits of the base address in the register are manipulated via the step (d).

26. A data processing system comprising:
a packaged integrated circuit containing a central processing unit for providing a base address;
a first counter for latching at least a portion of the base address, the first counter being internal to the packaged integrated circuit;
an external input terminal of the packaged integrated circuit coupled to the counter for receiving a cycle longword address (CLA) control signal from external to the packaged integrated circuit, the cycle longword address control signal selectively instructing the first counter to change the at least a portion of the base address;
a plurality of registers which store a plurality of timer values, the plurality of registers being within the packaged integrated circuit;
a multiplexer coupled to the plurality of registers;
a second counter coupled to the multiplexer for receiving at least one timer value within the plurality of timer values via the multiplexer; and
an external output terminal of the packaged integrated circuit for providing a termination control signal (SAS) external to the packaged integrated circuit.

27. The data processing system of claim 26 wherein the external input terminal is coupled to the external output terminal so that the termination control signal output from the external output terminal is input to the external input terminal as the cycle longword address (CLA) control signal.

28. The data processing system of claim 26 wherein a memory device is coupled to a bus output from the packaged integrated circuit, the memory device receiving the base address and any permutations thereof from the first counter and providing a plurality of data values as input to the packaged integrated circuit in response to the base address and any permutations thereof.

29. The data processing system of claim 28 wherein a memory device provides the cycle longword address (CLA) control signal to the external input terminal.

30. The data processing system of claim 26 wherein the second counter outputs a qualifying enable control signal wherein the qualifying enable control signal is used to ignore a bus termination signal input to the packaged integrated circuit for a period of time as determined by the second counter.

31. The data processing system of claim 26 wherein the second counter outputs a qualifying enable control signal wherein the qualifying enable control signal is used to ignore a plurality of bus termination signal inputs to the packaged integrated circuit for a period of time as determined by the second counter.

* * * * *